Jan. 10, 1956   D. H. M. DAVIDSON ET AL   2,730,166
MOBILE TROLLEY MOUNTED TIRE REMOVING MACHINE
Filed Aug. 20, 1952   7 Sheets-Sheet 1

INVENTORS
Douglas H. M. Davidson
Albert C. Barltrop
By Watson, Cole, Grindle & Watson
ATTORNEYS Jan. 10, 1956  D. H. M. DAVIDSON ET AL  2,730,166
MOBILE TROLLEY MOUNTED TIRE REMOVING MACHINE
Filed Aug. 20, 1952  7 Sheets-Sheet 2

INVENTORS
Douglas H. M. Davidson
Albert C. Bartrop
By Watson Cole, Grindle & Watson
ATTORNEYS Jan. 10, 1956  D. H. M. DAVIDSON ET AL  2,730,166
MOBILE TROLLEY MOUNTED TIRE REMOVING MACHINE
Filed Aug. 20, 1952  7 Sheets-Sheet 3

INVENTORS
Douglas H. M. Davidson
Albert C. Barltrop
By Watson, Cole, Grindle & Watson
ATTORNEYS Jan. 10, 1956    D. H. M. DAVIDSON ET AL    2,730,166
MOBILE TROLLEY MOUNTED TIRE REMOVING MACHINE
Filed Aug. 20, 1952    7 Sheets-Sheet 4

INVENTORS
Douglas H. M. Davidson
Albert C. Barltrop
By Watson, Cole, Grindle & Watson
ATTORNEYS Jan. 10, 1956   D. H. M. DAVIDSON ET AL   2,730,166
MOBILE TROLLEY MOUNTED TIRE REMOVING MACHINE
Filed Aug. 20, 1952   7 Sheets-Sheet 5

INVENTORS
Douglas H. M. Davidson
Albert Charles Barltrop
By: Watson, Cole, Grindle & Watson
ATTORNEYS Jan. 10, 1956  D. H. M. DAVIDSON ET AL  2,730,166
MOBILE TROLLEY MOUNTED TIRE REMOVING MACHINE
Filed Aug. 20, 1952  7 Sheets-Sheet 7

Inventors:
Douglas H. M. Davidson and
Albert C. Barltrop
Watson, Cole, Grindle & Watson
Attys United States Patent Office 2,730,166
Patented Jan. 10, 1956

2,730,166

MOBILE TROLLEY MOUNTED TIRE REMOVING MACHINE

Douglas Henry Musgrave Davidson, Effingham, and Albert Charles Barltrop, Southgate, London, England, said Barltrop assignor to Norman Gurney Randall, London, England Application August 20, 1952, Serial No. 305,384

7 Claims. (Cl. 157—1.2)

The invention relates to a machine for removing tires from wheels and more specially large pneumatic tires such as are used for aeroplanes, lorries and other heavy road vehicles from wheels of the kind having one lip or flange of the rim removable, usually in the form of a detachable ring. A difficulty which arises with such large tires is that after a period of use they become firmly bonded to the rim of the wheel and can only be removed by the use of considerable force. Various forms of tire removing machines capable of applying the necessary force have been proposed and used and it is an object of the present invention to provide an improved machine for this purpose. More particularly to provide a machine which is easy and quick to operate and which, in a preferred form is mobile both for the purpose of facilitating the operation of the machine and also so that it may readily be stored out of the way when not required.

The invention consists in a machine for removing a tire from a wheel and comprising supporting means for holding the wheel against downwardly directed axial thrust, elevating means for elevating the supporting means with the wheel so supported and abutment means for engaging the tire and pushing the tire off the wheel during such elevation.

In a preferred form of the invention the supporting means comprise a stand and the elevating means with the abutment means are mobile so that they may be moved over the stand after the wheel has been placed thereon and a readily detachable connection is provided for connecting the stand to the elevating means. The elevating means and the abutment means may, for example, be carried on a mobile trolley.

The abutment means may comprise a multiplicity of blades, spaced around a circle to engage the tire at circumferentially distributed positions and arranged to present a flat or curved surface to engage the tire substantially tangentially to a side wall of the tire. Preferably the blades have a free edge which may be inserted under a flange on the wheel after the tire has been initially separated therefrom the said free edge being turned away from the wall of the tire so that the blade makes pressure engagement with the tire at a position spaced a short distance from the free edge and tends to separate the tire from the rim by a peeling action. To enable the machine to be adapted to tires of different sizes the blades are preferably adjustable in the radial direction. It is preferred that, for the purpose of this adjustment, the blades are carried on slides movable along radially extending supporting arms, this arrangement having the advantage that the adjustment does not change the angle which the blades make with the surface of the tire.

An important feature of one construction of a machine according to the invention consists in the inclusion of means whereby the abutment blades or equivalent devices may be moved radially inwardly for insertion of the free edges of the blades under the flange of the wheel after initial separation of the tire from the wheel has been effected and while pressure is maintained on the tire.

Two specific constructions of tire removing machines embodying the above and other features of the invention will now be described by way of example and with reference to the accompanying drawings in which:

Figure 1 is a perspective view of one of the machines,

Figure 2 is a view showing the stand employed in the machine with a wheel and tire in position, Figure 3 is a detail view of the stand and wheel support, Figure 4 shows an alternative wheel support for use use with the stand, Figure 5 shows a stage in the removal of a tire, Figure 6 shows the fitting of a split ring, Figure 7 is a detail view showing the shape of the abutments and the operation thereof, Figure 8 is a diagrammatic view showing an arrangement for effecting simultaneous radial adjustment of the blades.

Figure 1:
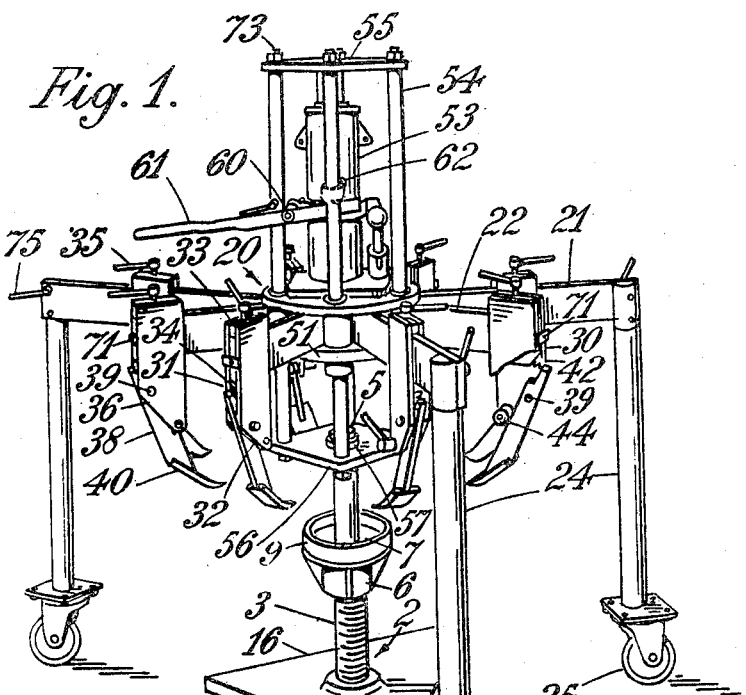
Figure 2:
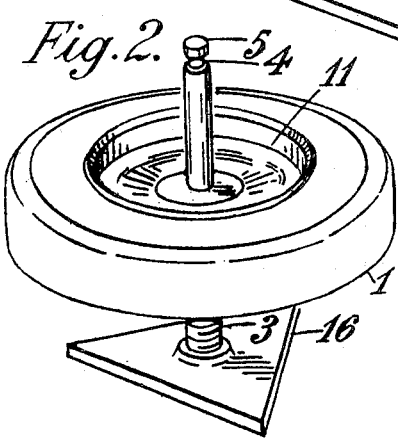
Figure 3:
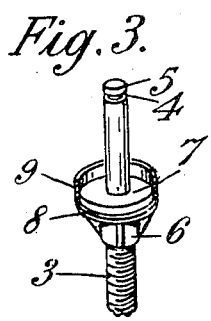
Figure 4:
Figure 5:
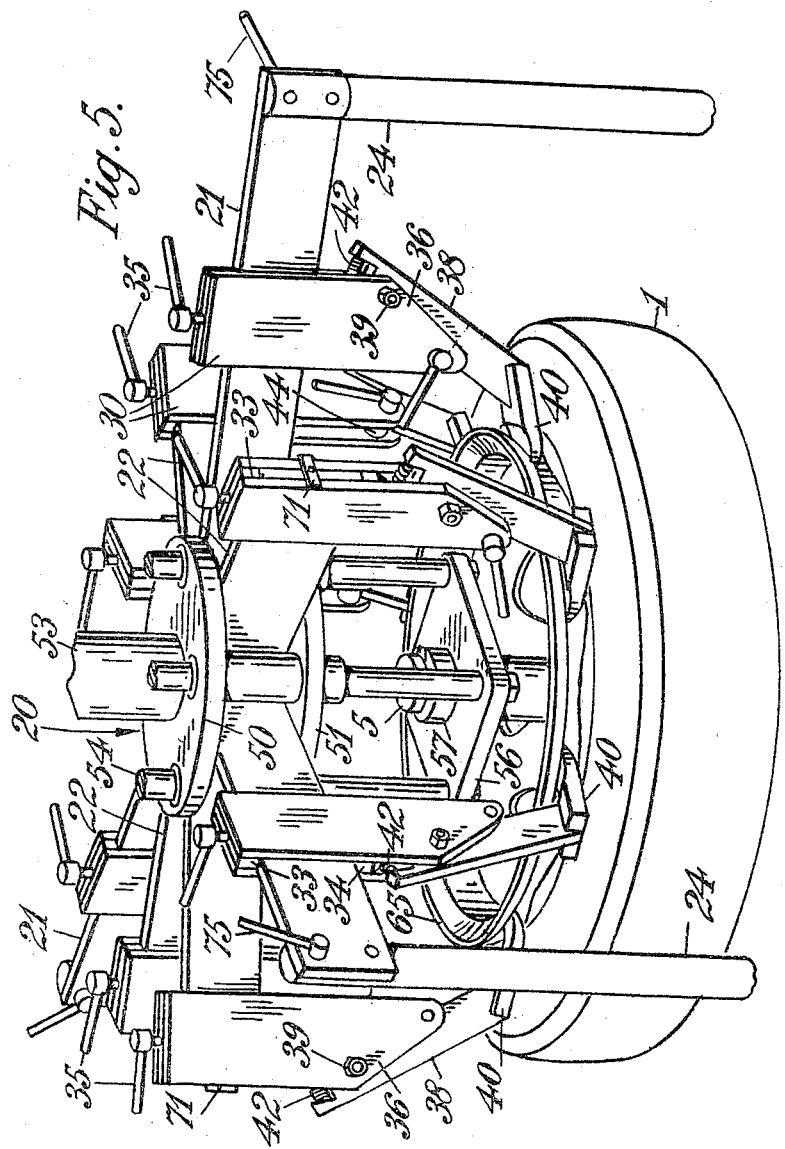
Figure 6:
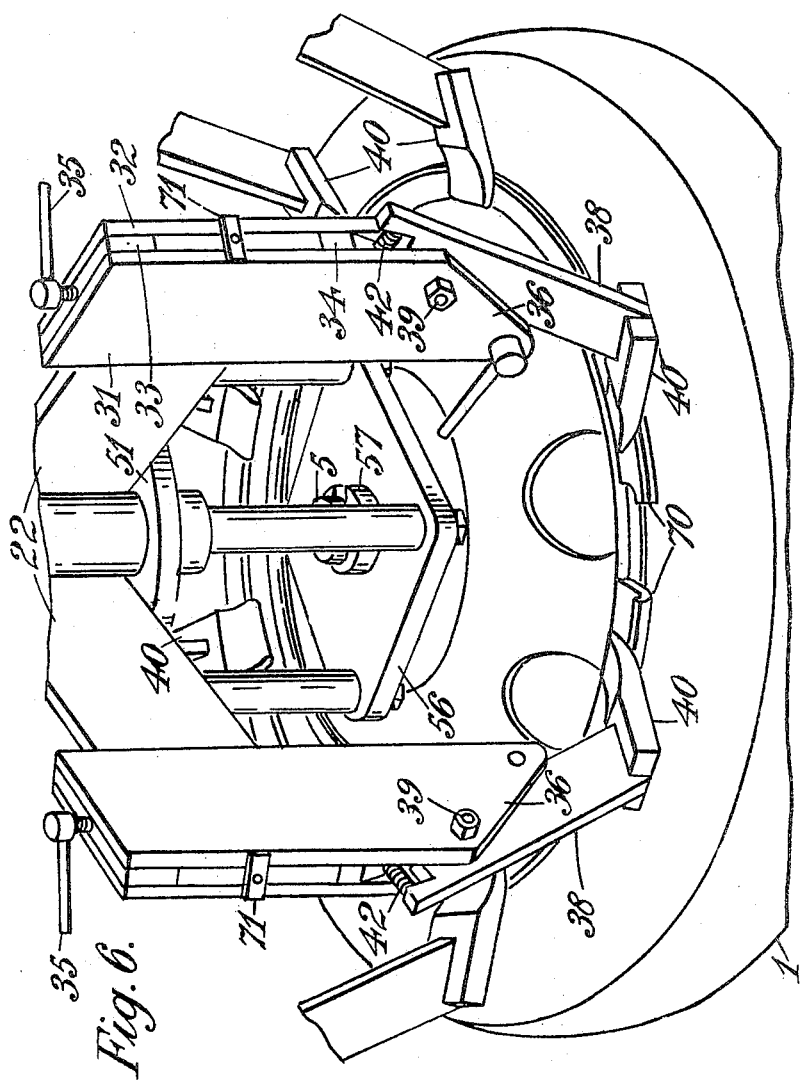

In the example shown in Figures 1–8 the means for supporting the wheel 1 comprise a stand 2 having an axial upstanding pillar 3 with a circumferential groove 4 near the upper end providing, above the groove, a head 5 under which a C-washer may be fitted as later described. The pillar is formed with a screw-thread engaged by a nut 6 providing at its upper end a flat circular platform 7. The platform is provided with a step 8 around its periphery and a readily removable ring 9 seats on the step. The ring is in the form of a short length of tube and its upper edge provides a seat for the disc portion 11 of a vehicle wheel threaded over the top of the pillar and lying horizontally, the hub portion, if any, of the wheel being received within the ring. To accommodate wheels of larger size the ring may be replaced by one of a set of supports (see Figure 4) of different outside diameters and consisting of two concentric rings 12, 13, secured by radial webs 14, the inner ring 12 being adapted to seat on the step of the platform in place of the ring 9 and the outer ring 13 to support the wheel. The stand has a flat triangular base 16 arranged to rest on the ground. The purpose of the screw-thread and nut is to enable the initial height of the wheel to be adjusted.

The elevating means and the abutment means are carried on a trolley. The trolley comprises a central frame 20 from which radiates eight arms 21, 22, each arm being constructed of rectangular section bar with its longer sides vertical. The arms radiate at equal angles. The three arms 21 have secured to their free ends dependent tubular members 24 constituting the legs of the trolley. Caster wheels 25 are attached to the lower ends of the legs.

Figure 7:
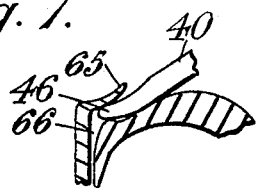

Slidable along each arm there is a bracket 30 composed of two vertically extending side plates 31, 32 one to each side of the arm and two distance pieces 33, 34 between the plates one above and one below the arm. A clamping screw 35 passes through the upper distance piece to make clamping engagement with the arm and to hold the bracket in any desired position of adjustment along the arm. Each bracket has a portion 36 depending from the arm to which it is attached and at a position intermediate in the length of this dependent portion there is pivoted an upwardly extending lever 38 the pivotal axis 39 being horizontal and perpendicular to the length of the arm. At its lower end the lever carries an abutment blade 40 and at the upper end of the lever there is a spring 42 reacting against a portion of the bracket to urge the lever for rotation in a direction to move the blade inwardly of the trolley towards the central frame. The lever is received between the two sides plates of the bracket and at the lower end of the dependent portion of the bracket there is a manually operable eccentric 44 (Figures 1 and 5) by which the lever may be moved against the action of the spring to move the blade outwardly. The blade slopes downwardly and inwardly towards the centre of the trolley and is tapered in thickness towards its lower free end, the under surface of the blade being at an angle approximately conforming to the wall of a tire to be removed and being turned upwardly at its free edge 46 as best seen in Figure 7.

The frame 20 of the trolley comprises a pair of plates 50, 51 welded to the arms 21, 22. Secured to the plate 50 and upstanding therefrom there is a hydraulic jack 53. There is a sub-frame composed of four upright rods 54 which are slidable in guideways in the frame plates, a horizontal plate 55 which normally rests on top of the jack and to which the upper ends of the rods are attached and a second plate 56 to which the lower ends of the rods are attached and which has a central aperture for fitting over the top of the pillar 3 of the stand and to be retained thereon by the C-washer 57.

Pivoted at 60 to the body of the jack there is a lever 61 of which one end engages a roller 62 on one of the rods, the arrangement being that by manual operation of the lever it is possible to elevate the rods and the top and bottom plates attached to them.

The machine may be employed to remove a tire from a wheel of the kind having one lip of the rim in the form of a split ring, in the following manner. The wheel is placed on the stand 2 with the split ring uppermost and the web or disc of the wheel resting on the supporting ring 9. The stand is adjusted for height so that the tire is slightly below the level of the abutment blades 40. The trolley is then wheeled over the stand so that the aperture in the lower plate 56 is over the top of the pillar. The normal position of the plate 56 is below the level of the top of the pillar 3 and to enable it to be moved over the pillar the lever 61 is operated to lift the assembly of the two plates 55, 56 and their rods 54. When the trolley is in position over the stand the assembly is lowered to locate the lower plate 56 around the upper end of the pillar and the C-washer inserted in the groove 4. The brackets 30 carrying the abutment blades 40 are then adjusted, unless they are already appropriately positioned, to position the blades to engage the tire immediately outside the detachable ring. The jack 53 is then operated to lift the upper plate 55 which carries with it the lower plate 56, the lower plate in turn lifting the stand so that the tire is brought into engagement with the blades 40. Continued operation of the jack elevates the stand and wheel so that the tire is forced from the detachable ring which is then manually removed. The jack is released to lower the wheel and the trolley removed. The wheel is then inverted on the stand and the trolley replaced and reconnected to the stand. The jack is then again operated lifting the wheel to engage the tire with the abutment blades 40 and to force the tire away from the fixed lip 65 of the wheel rim. Up to this stage the operations are carried out with the eccentrics 44 positioned to retain the blades in their outermost positions in relation to the brackets 30. The eccentrics are now turned to release the blades and the operation of the jack continued. This has the effect of causing the blades to move inwardly under the rim 65 of the wheel into the position shown in Figures 5 and 7. From Figure 7 it may be seen that the shape of the free edges 46 of the blades results in a tendency for the tire to separate from the rim by a peeling action as indicated at 66. Continued operation of the jack gradually causes the tire to be pushed off the rim and it is to be noted that the spacing of the blades around the wheel causes the parts of the tire immediately under the blades to move in advance of the parts between the blades which also provides a peeling action tending to facilitate separation of the tire from the rim.

It is a further advantage of the machine described above that it may be used, as shown in Figure 6, to facilitate the fitting of a split detachable ring 70 to complete the assembly of a new tire on a wheel. When using the machine for this purpose the wheel and tire assembly with the ring resting on the upper face of the wheel is mounted on the stand and the stand secured to the plate 56 as above described. Each abutment blade is then adjusted to engage the ring just inside the upper outer edge of the ring (see Figure 6) and pressure is applied by means of the jack. The effect is to cause the ring to expand. Finally the ring is tapped into position. Used in this way any risk of the ring flying out and causing injury is avoided as the ring is trapped within the machine.

The machine forming the subject of the above example is arranged to be easily and quickly dismantled for packing and transportation. The operation of dismantling is carried out as follows. The brackets 30 are first slid off the ends of the arms 22, the retaining buttons 71 being turned to the in-line position to permit this operation. The nuts 73 are next removed from the rods 54 to permit removal of the top plate 55 and lowering to the ground of the bottom plate and rods 54. As a modification to facilitate this operation the nuts 73 may be replaced by a quick release device. The next operation is the removal of the jack after release of the bolts by which it is secured to the frame 20. The legs 24 are then detached from the arms 21 by release of the bolts 75 and finally the slides are removed from the arms 21. If desired the stand may be dismantled by removing the pillar from the base.

Figure 8:
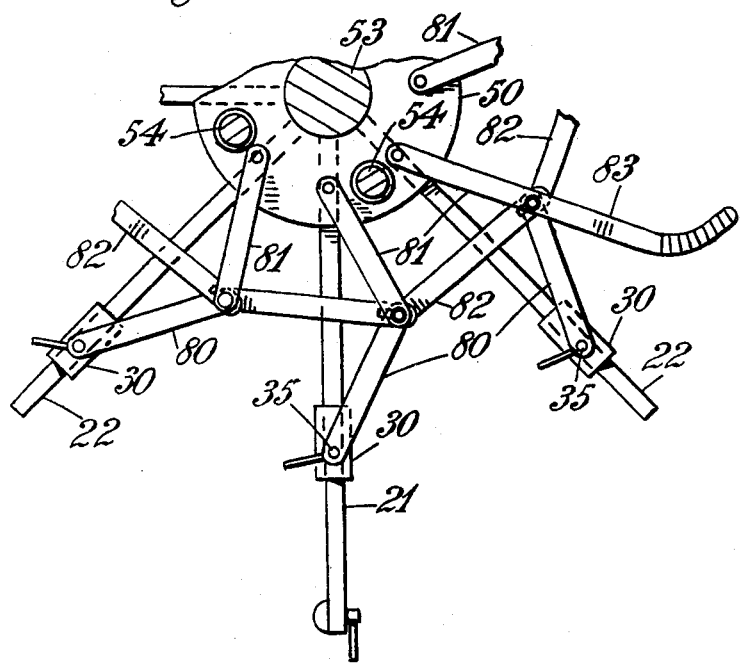

Figure 8 shows a modification of the above example embodying means for effecting simultaneous radial adjustment of all the brackets 30 and their associated blades 40. Each bracket is connected by a pair of toggle links 80, 81 to the top plate 50. The toggle joint of each pair of links is connected by a tie 82 to the adjacent joint so that the ties form a ring around the plate 50. One of the links 81 has an extension 83 forming a handle by which all the toggles may be adjusted to move the brackets 30 inwardly or outwardly. To facilitate the initial erection of the machine the effective lengths of the ties 82 is adjustable. For this purpose one end of each tie has a slot along which the pivot pin of the toggle joint is adjustable, the pin being clamped in position after adjustment.

Figure 9:
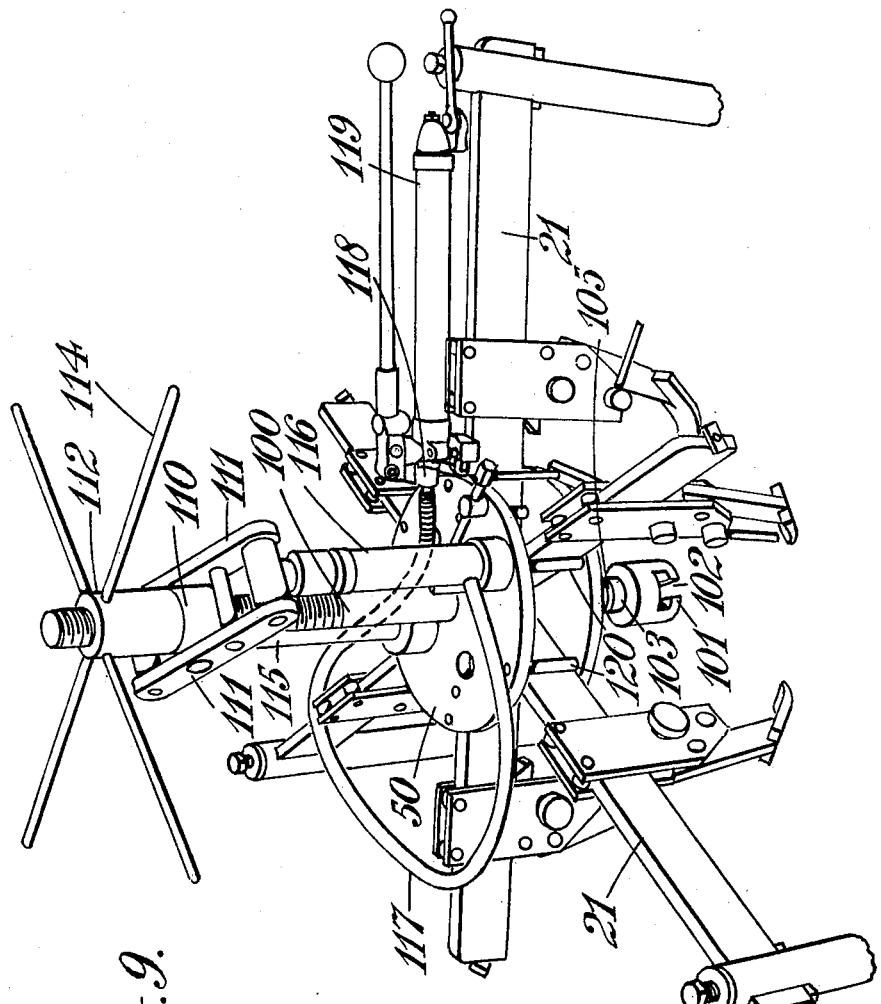
Figure 9 is a perspective view of the second machine.
Figure 10:
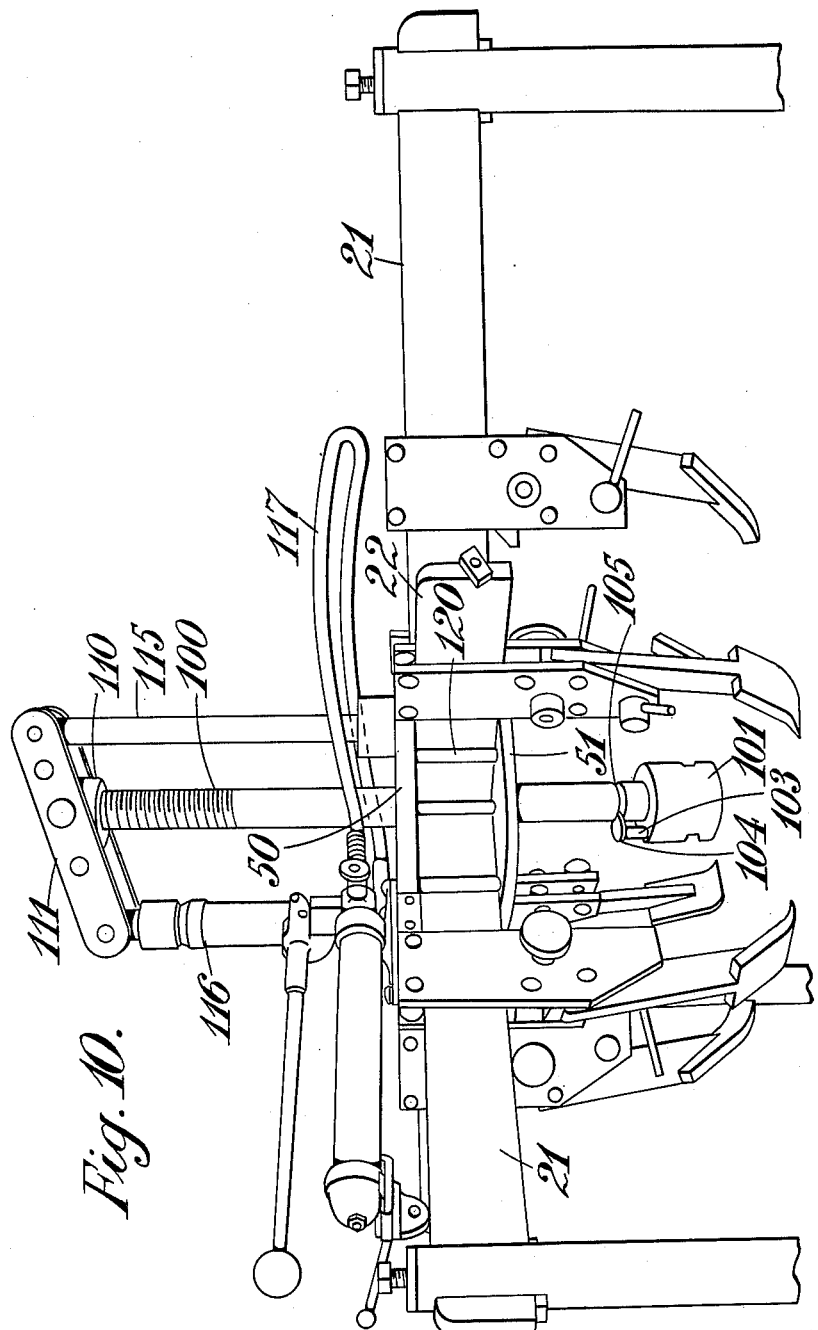
Figure 10 is a side view of part of the machine shown in Figure 9.

In the example shown in Figures 9 and 10 the abutment means are substantially as in the previous example but a different form of elevating means is provided. The stand is as in the previous example.

The elevating means comprise a central rod 100 guided in the two plates 50, 51, and having a socket 101 at its lower end for engagement with the head 5 of the stand. The socket has a T slot 102 within which the head 5 is slidable and there is provided a locking pin 103. The pin 103 is guided for vertical movement in the socket and may be lowered to obstruct the mouth of the socket. The pin has a radial bar 104 in its upper end which may be located in a groove 105 in the rod 100 when it is desired to hold the pin raised.

At its upper end the rod 100 is guided in a bearing member 110 trunnioned in the side members of a lever 111.

Figure 11:
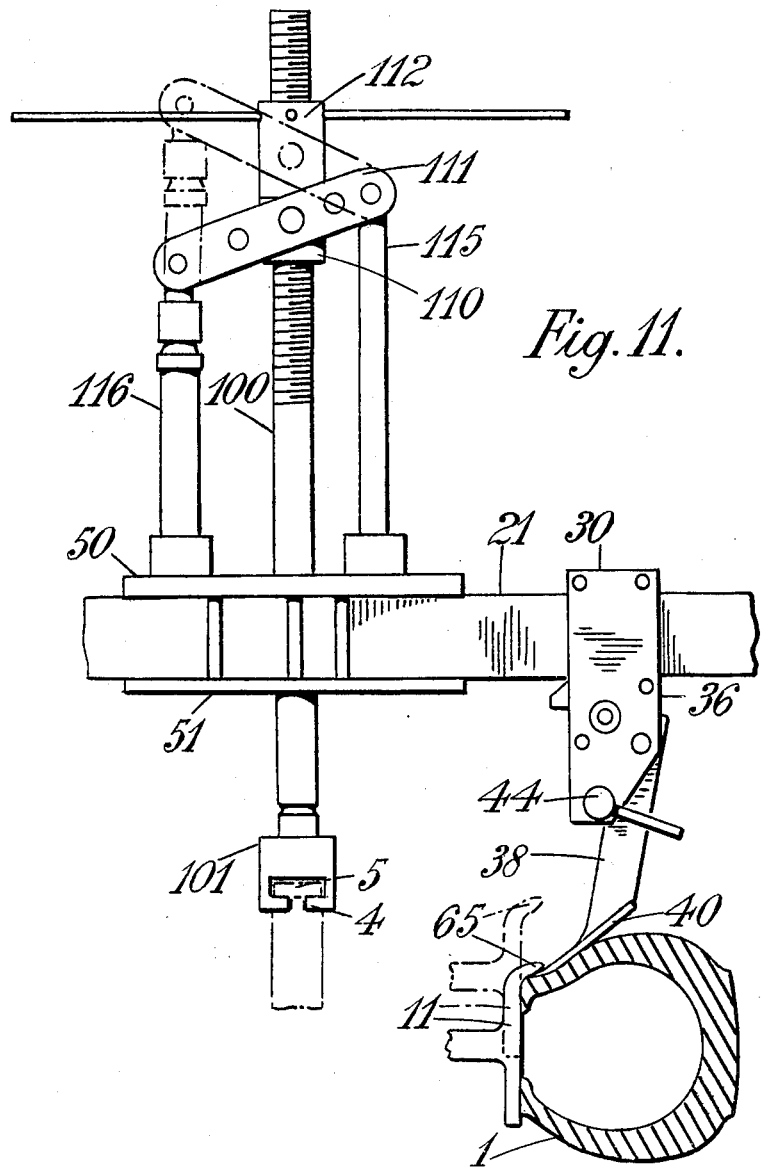
Figure 11 is a fragmentary view of the second machine illustrating the action of the elevating means thereof.

Above the lever there is a nut 112 in screw-threaded engagement with the rod, the nut having radial arms 114 by which it may be rotated to effect an initial elevation of the rod 100 and a stand and wheel carried thereby. One end of the lever 111 is pivotally secured to a pillar 115 upstanding from the plate 50 and there is a hydraulic jack 116 extending between the other end of the lever 111 and the plate 50. The attachments of the jack 116 and pillar 115 to the plate 50 permit limited outward pivotal movement of the jack and pillar to allow for the movements of the lever 111. Extension of the jack accordingly raises the rod 100 with mechanical advantage. This action is illustrated in Figure 11, which shows one position of the parts 100, 101, 111, 116 and 65 in broken lines. A pump 118 and oil reservoir 119 secured to one of the arms 21 are provided for operating the jack 116 and are connected thereto by a flexible pipe 117.

In this example the arms 21, 22 are not welded to the plates 50, 51. The arrangement is that the plates clamp the arms between them, bolts 120 extending between the plates on each side of the arm and screwed into the plate 50 being used to provide the clamping pressure.

The invention is not restricted to the constructional details described in the above examples and shown in the drawings. For instance, in some circumstances it may be found preferable that the free edges 46 of the blades are turned slightly downwardly or continue the general direction of the blades. The lever 61 employed in the first example to elevate the rods and plates may be replaced by a toggle mechanism to effect the elevation and this mechanism may incorporate an overcentre lock to hold the parts raised. Further the clamping screws 35 may be replaced by pawls pivoted within the brackets 30 beneath the arms 21, 22 and engaging in ratchet teeth on the underside of the arms, locking screws being provided for effecting positive engagement of the pawls with the teeth.

We claim:

1. A machine for removing a tire from a wheel comprising a stand including a base and means extending upwardly from said base for supporting the wheel against downwardly directed thrust, a frame having a plurality of spaced supporting legs and trolley wheels attached to the lower ends of said legs so that the frame may be moved over the stand after the wheel has been placed thereon, elevating means carried by said frame, a readily detachable connection for connecting said stand to said elevating means, and a multiplicity of blades attached to said frame and spaced around a circle to engage the tire at circumferentially distributed positions, said blades having surfaces shaped to engage the tire substantially tangentially to a side wall of the tire to push the tire off the wheel during the elevation of the stand.

2. A machine as claimed in claim 1 in which the blades are pivotally supported for movement radially inwardly for insertion under a flange on the wheel after the tire has been initially separated therefrom, in which the pivotal axis of each blade is above and radially outside the position of contact of the blade with the tire so that pressure engagement with the tire urges the blade radially inwardly in which the pivotal supports for the blades are radially adjustable in position and in which there is provided for each blade releasable holding means for holding the blades against inward movement as aforesaid.

3. A machine for removing a tire from a wheel comprising a stand including a base and means extending upwardly from said base for supporting the wheel against downwardly directed thrust, a frame having a plurality of spaced supporting legs, trolley wheels attached to the lower ends of said legs so that the frame may be moved over the stand after the wheel has been placed thereon, a hydraulic jack carried by said frame for elevating said stand, a readily detachable connection for connecting said stand to said hydraulic jack, and a multiplicity of blades attached to said frame and spaced to engage the tire at circumferentially distributed positions, said blades having surfaces shaped to engage the tire substantially tangentially to a side wall of the tire to push the tire off the wheel during the elevation of the stand.

4. A machine for removing a tire from a wheel and comprising a stand, composed of a base, a pillar upstanding from the base and supporting means on the pillar for supporting a wheel threaded over the pillar and lying in a horizontal plane, in combination with a mobile three-legged wheeled trolley, which is capable of being wheeled over the stand after a wheel and tire have been placed thereon and which comprises a central support frame, at least three arms radiating from the central frame, three wheeled legs attached to and depending from the ends of three of the arms, a slide on each of the arms and movable along the arm, a blade dependent from each slide and providing at its lower end a downwardly facing abutment surface, a sub-frame guided for vertical sliding movement on the central support frame and having below the support frame means for attachment to the top of the aforesaid pillar, and a hydraulic jack extending upwardly from the support frame and engaging the sub-frame above the support frame, whereby on operation of the jack, the sub-frame may be elevated to lift the stand and a wheel carried thereby to bring a tire on the wheel into engagement with the abutment surfaces aforesaid and on continued operation to draw the wheel upwardly through the tire.

5. A machine as claimed in claim 4 and including manually operable elevating means for elevating the sub-frame relative to the support frame and trolley independently of the jack to enable the sub-frame to be lifted clear of the stand and to enable the trolley to be wheeled over the stand.

6. A machine as claimed in claim 4 in which there are eight arms and slides.

7. A machine for removing a tire from a wheel and comprising a stand for supporting the wheel against downwardly directed axial thrust, a mobile trolley movable over the stand after a wheel has been placed thereon, a lifting member guided on the trolley for upward movement thereon and having means for making a detachable connection with the stand, a lever pivoted to the trolley at one end, and pivoted to the lifting member intermediate its length, a hydraulic jack operating between the other end of the lever and a support on the trolley to elevate the lever and the lifting member and stand carried thereby and a multiplicity of abutment members carried by the trolley at positions to engage a tire on a wheel supported as aforesaid and to push the tire off the wheel during elevation thereof as aforesaid.

References Cited in the file of this patent

UNITED STATES PATENTS

| Number | Name | Date |
|---|---|---|
| 1,564,496 | Staugaard | Dec. 8, 1925 |
| 2,373,975 | Plumeau et al. | Apr. 17, 1945 |
| 2,401,881 | Petsche | June 11, 1946 |
| 2,406,996 | Colley | Sept. 3, 1946 |
| 2,436,003 | Gosselin | Feb. 17, 1948 |
| 2,442,714 | Stack | June 1, 1948 |
| 2,470,534 | Thomas | May 17, 1949 |
| 2,488,539 | Holbrook | Nov. 22, 1949 |
| 2,495,118 | McCollister | Jan. 17, 1950 |
| 2,508,520 | Johnson | May 23, 1950 |
| 2,537,041 | Finch | Jan. 9, 1951 |
| 2,538,962 | Branick | Jan. 23, 1951 |
| 2,551,994 | Bloodworth | May 8, 1951 |